United States Patent [19]

Asano et al.

[11] 4,127,889
[45] Nov. 28, 1978

[54] ELECTROMAGNETIC DAMPING MECHANISM FOR FORCE MOTOR

[75] Inventors: Masuyuki Asano, Nishikasugai; Shojiro Omuro, Nagoya, both of Japan

[73] Assignee: Mitsubishi Jukogyo Kabushiki Kaisha, Japan

[21] Appl. No.: 737,341

[22] Filed: Nov. 1, 1976

[30] Foreign Application Priority Data

Oct. 31, 1975 [JP] Japan .................... 50-131261

[51] Int. Cl.² ............................................ H02K 35/00
[52] U.S. Cl. ............................ 361/159; 310/27; 318/436; 310/13
[58] Field of Search ................. 361/159; 310/13, 15, 310/26, 27; 335/246, 241, 234, 239; 318/132, 436; 323/50, 85–88

[56] References Cited

U.S. PATENT DOCUMENTS

| | | | |
|---|---|---|---|
| 2,810,842 | 10/1957 | Lewis | 310/27 |
| 3,149,274 | 9/1964 | Hetzel | 318/132 |
| 3,610,973 | 10/1971 | Bauer et al. | 310/15 |
| 3,654,540 | 4/1972 | Honig et al. | 310/26 |

*Primary Examiner*—Gerald Goldberg
*Attorney, Agent, or Firm*—McGlew and Tuttle

[57] ABSTRACT

An electromagnetic damping mechanism for a force motor comprising a drive coil, a damping coil, and static coils located about the drive and damping coils to offset the self-induction occurring in the two coils, so that a voltage proportional to the velocity of motion can be induced in the damping coil.

6 Claims, 5 Drawing Figures

ELECTROMAGNETIC DAMPING MECHANISM FOR FORCE MOTOR

FIELD OF THE INVENTION

1. Background of the Invention

This invention relates to an electromagnetic damping mechanism for a force motor with dynamic characteristics improved by eliminating the effect of eddy currents produced in its magnetic circuit.

As is well-known, servo valves for controlling hydraulic pressure or the like are equipped with a built-in force motor for providing displacement in proportion to input electric signals.

The force motor, in the prior art has a movable core or mechanism arranged to cause linear movement, includes an electromagnetic damping mechanism now to be described. As shown in FIG. 1, the mechanism comprises a drive coil 1 and a damping (short-circuit) coil 2 arranged side by side. The coil 2 is secured, coaxially with the drive coil 1, onto a drive coil frame (not shown), and the two coils are placed in a fixed magnetic field formed between a magnetic pole member and a pole piece (both not shown).

The electromagnetic damping action of the damping coil 2 will now be described. As an alternating current is input to the drive coil 1, a magnetic flux proportional to the current intensity develops in the coil 1, causing the coil to move accordingly in the fixed magnetic field. The damping coil 2 moves together with the drive coil 1 in the fixed magnetic field, and therefore a voltage proportional to the motion of the drive coil frame is induced in the coil 2.

Aside from the electromotive force thus induced, a so-called mutual induction voltage is produced in the damping coil 2 by the magnetic flux of the drive coil 1.

2. Description of the Prior Art

The mutual induction voltage appearing in the damping coil theoretically leads the current energizing the drive coil 1 by a phase angle of 90°. Actually, however, eddy currents produced in the magnetic pole member and pole piece by the magnetic flux from the coil 1 will have a retarding action and hinder the provision of the exactly 90° phase difference. Hence the mutual induction voltage is not directly proportional to the motion of the drive coil frame.

Thus, the existing electromagnetic damping mechanisms for force motors have had a common problem of deteriorating dynamic characteristics because of less and less force being induced in the damping coil 2 than the magnitude proportional to the velocity of motion of the drive coil frame.

SUMMARY OF THE INVENTION

The present invention aims at providing an electromagnetic damping mechanism for a force motor with dynamic characteristics improved by eliminating the effect of eddy currents produced in its magnetic circuit (composed of the pole piece and magnetic pole member, for example).

This objective of the invention is attained by providing an electromagnetic damping mechanism of a construction such that static coils are disposed about a drive coil and a damping coil to cancel out the self-induction of the latter two coils and eliminate the electromagnetic coupling which is due to mutual induction between the drive and damping coils, whereby a great damping force is induced in proportion to the velocity of motion of the drive coil frame. This brings remarkable improvements in the dynamic characteristics of the force motor for use primarily with a servo valve.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
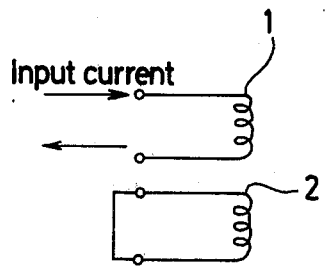
FIG. 1 is a schematic diagram illustrating the principle of a conventional electromagnetic damping mechanism for a force motor.
Figure 2:
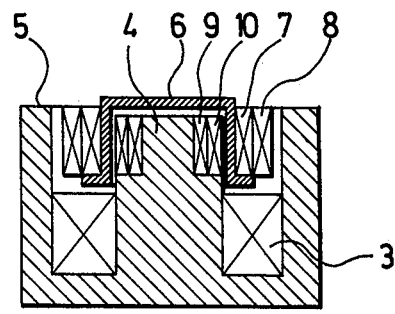
FIG. 2 is a schematic vertical sectional view of an electromagnetic damping mechanism for a force motor embodying the present invention.

Referring specifically to FIG. 2, an excitation coil or permanent magnet 3, a pole piece 4, and a magnetic pole member 5 cooperate to form a fixed magnetic field, in which a drive coil frame 6 is adapted to move upwardly and downwardly as viewed in the figure. It is this motion of the frame that causes the displacement of the force motor.

A drive coil 7 and a damping coil 8 are attached to the drive coil frame 6, while first and second static coils 9, and 10 are secured to the pole piece 4 or magnetic pole member 5. The first static coil 9 and the drive coil 7 are concentrically disposed at a radial distance from which is each equal to that of the second static coil 10 from the damping coil 8. Also, the coils 7 and 9 are identical in the number of turns and the winding direction as are the coils 8 and 10.

Figure 3:
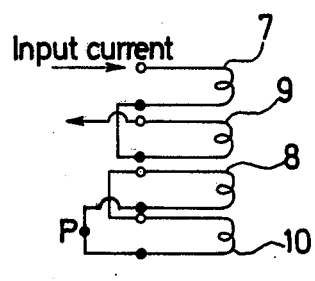
FIGS. 3, 4 and 5 are connection diagrams of coils in other embodiments of the invention.
Figure 4:
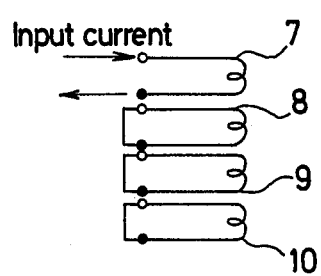
Figure 5:
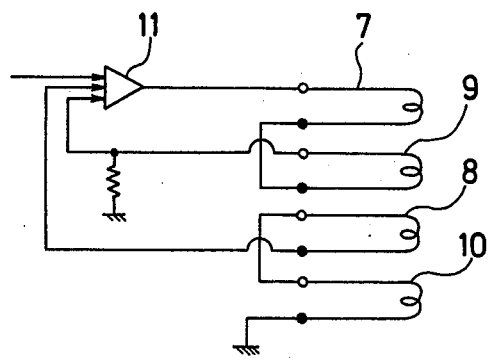

The modes of connection of those coils are illustrated in FIGS. 3, 4 and 5. Throughout these diagrams the tiny circles or white dots at the coil ends indicate starting ends of coiling and black dots indicate finishing ends.

Turning first to FIG. 3, the finishing ends of the drive coil 7 and the static coil 9 are connected together, and the starting and finishing ends of the damping coil 8 are connected, respectively, to those of the static coil 10.

When the coils are connected in the way shown and described, any magnetic flux induced in the drive coil 7 by an input current applied between the starting ends of the coils 7, 9 will be cancelled out by the static coil 9. Similarly, any magnetic flux induced by a current produced in the damping coil 8 will be killed by the static coil 10. As a consequence, no change in the magnetic flux or no eddy current generation in the magnetic circuit will take place. Thus, the coils 7, 9 are not electromagnetically coupled to the coils 8, 10, and only the current induced by the motion of the drive coil 7 will pass through the damping coil 9, imparting the force motor with a damping force proportional to the velocity of the drive coil frame 6.

Another embodiment is illustrated in FIG. 4, where the damping coil 8 and static coils 9, 10 are connected to form a short circuit. In this case the magnetic flux produced by the current of the drive coil 7 is largely offset by the static coil 9, and the magnetic flux produced by the current of the damping coil 8 by the static coil 10.

It is well-known that, with an AC circuit comprising a primary coil and a secondary coil, shorting the secondary coil will materially reduce the mutual inductance between the two coils. Accordingly, the mutual inductances between the coils 7 and 9 and between the coils 8 and 10 are very low. If, therefore, any change occurs in the amount of current flowing through the coils 7, 8, the changes in the magnetic fluxes produced by the both coils will be very small. Thus, because the electromagnetic coupling between the drive coil 7 and the damping coil 8 is weakened, the damping force acting on the force motor will be substantially proportional to the velocity of the drive coil frame 6.

FIG. 5 shows a modification of the connection diagram in FIG. 3. In this embodiment the point P in FIG. 3 is cut open to feed back the voltage generated in the coils 8, 10 to a servoamplifier 11 so as to add a current proportional to the velocity of motion to the current in the drive coil 7 and obtain a force that acts counter to the moving direction of the drive frame, that is, a damping force.

The arrangement shown is advantageous because a desired amount of damping can be provided by the servoamplifier 11 and the wires of the damping coil 8 and static coil 10 may be of smaller size than in other arrangements.

Although the invention has been described in its preferred forms, it is to be understood that the invention is not limited thereto but various other modifications may be made without departing from the spirit and scope thereof.

For example, the static coil 9 or 10 in FIG. 2 may be located either inside or outside of the other with respect to the wall of the pole piece 4. Likewise, the drive coil 7 or damping coil 8 may be located inside or outside relative to the side wall of the drive coil frame 6. It will be appreciated by those skilled in the art that the coils in FIGS. 3 to 5 are shown in the form of windings simplified for brevity.

As will be understood from the foregoing, the electromagnetic damping mechanism for a force motor in accordance with the present invention includes static coils fixedly disposed along a drive coil and a damping coil and in the direction where they kill the self-inductive action of the latter two coils so as to eliminate the electromagnetic coupling due to mutual induction between the drive and damping coils and permit induction of a great damping force in proportion to the velocity of the drive coil frame, whereby the dynamic characteristics of the force motor primarily for a servo valve can be remarkably improved.

What is claimed is:

1. A force motor comprising a movable drive frame, a drive coil and damping coil attached to said drive frame, fixed magnetic field means disposed about said drive frame, a signal current supplied to said drive coil for causing movement of said drive frame, a first static coil connected to said magnetic field means adjacent said drive coil for offsetting the magnetic flux induced in said drive coil when said drive coil is supplied with the signal current, and a second static coil connected to said magnetic field means adjacent said damping coil for offsetting the magnetic flux induced in said damping coil when said drive coil is supplied with the signal current.

2. A force motor according to claim 1, wherein the number and direction of windings of said first static coil is identical to that of said drive coil with said signal current being supplied between the respective beginning ends of said drive coil and said first static coil and the respective terminating ends of said drive and first static coil being connected to each other, and wherein the number and direction of windings of said second static coil are identical to that of said damping coil with the respective beginning ends of said damping and second static coil being connected to each other and the respective terminating ends of said damping and second static coil being connected together.

3. A force motor according to claim 1, wherein the respective beginning ends of said damping coil, said first static coil and said second static coil are each connected to the respective terminating ends of said damping coil, said first static coil and said second static coil, and said signal current is supplied between the beginning and terminating ends of said drive coil.

4. A drive motor according to claim 1, wherein a feedback control amplifier is connected to the beginning end of said drive coil, the terminating end of said drive coil is connected to the terminating end of said first static coil, the beginning end of said first static coil is connected to an input of said feedback control amplifier, the beginning end of said damping coil being connected to the beginning end of said second static coil, and the terminating end of said damping coil being connected to an input of said feedback control amplifier whereby the current supplied to said drive coil is controlled in proportion to the voltage produced in said damping coil and said second static coil.

5. A drive motor according to claim 1, wherein said magnetic field means includes a pole piece and said first and second static coils are connected to said pole piece.

6. A force motor comprising a fixed magnetic field means including a central pole piece, a drive frame movable about said pole piece, first and second annular static coils disposed on said pole piece, and annular drive and damping coils connected to said movable drive frame disposed radially outwardly from said first and second static coils, said first static coil being electrically connected to said drive coil and said second static coil being electrically connected to said damping coil, and a current signal is supplied to said drive coil for moving said drive frame and inducing a voltage in said damping coil whereby a voltage induced in said first and second static coils counteracts the voltage induced in the drive and damping coils.

* * * * *